Feb. 24, 1948. T. E. BEACHAM 2,436,544
CONTROL GEAR FOR HYDRAULIC PUMPS
Filed Aug. 30, 1943 4 Sheets-Sheet 1
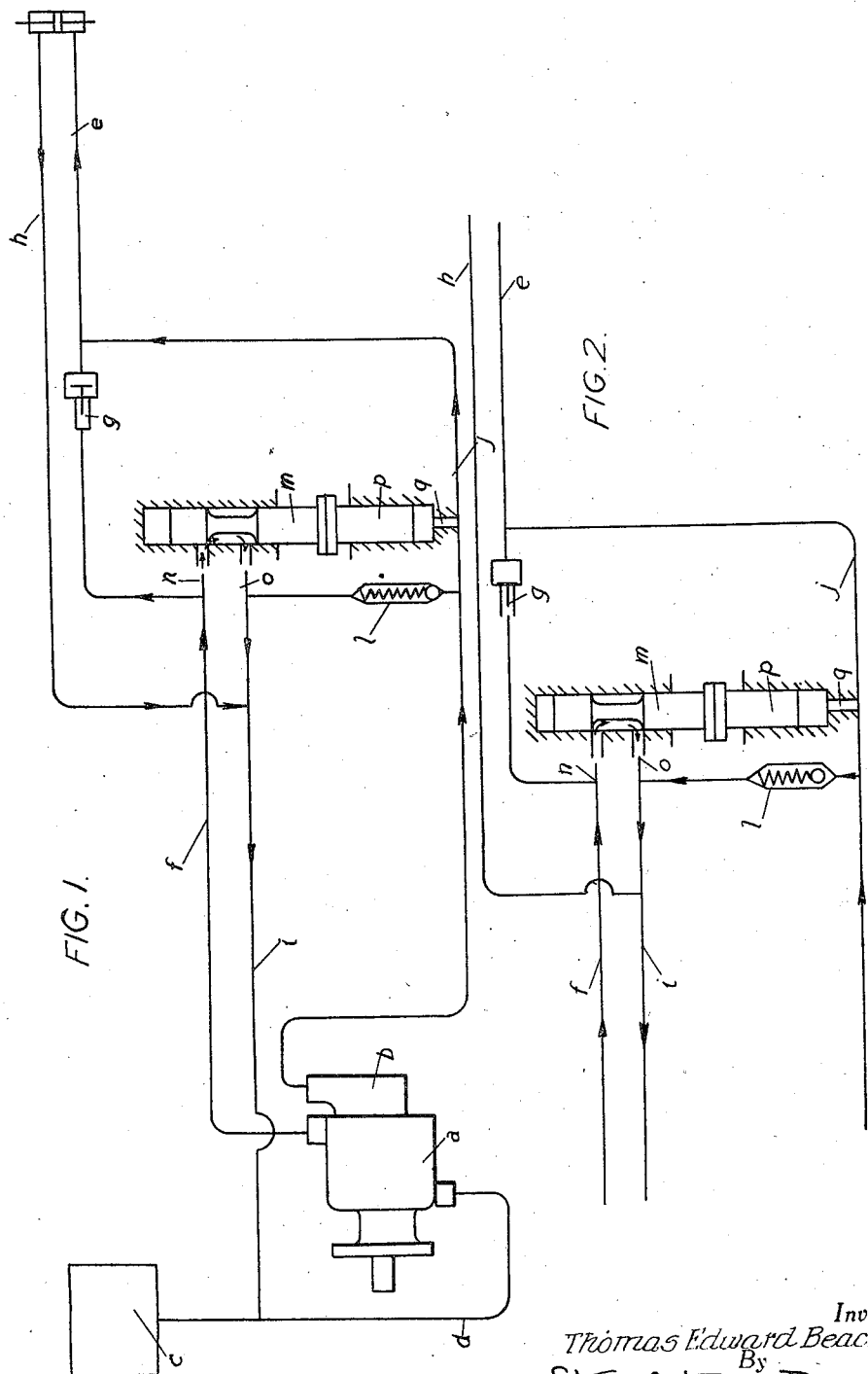
Inventor
Thomas Edward Beacham,
By
Stone, Artman + Bragon
Attorneys Feb. 24, 1948. T. E. BEACHAM 2,436,544
CONTROL GEAR FOR HYDRAULIC PUMPS
Filed Aug. 30, 1943 4 Sheets-Sheet 2
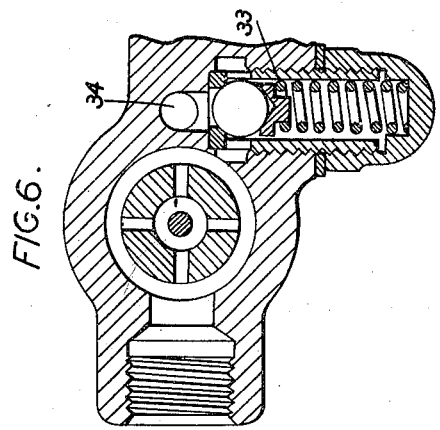
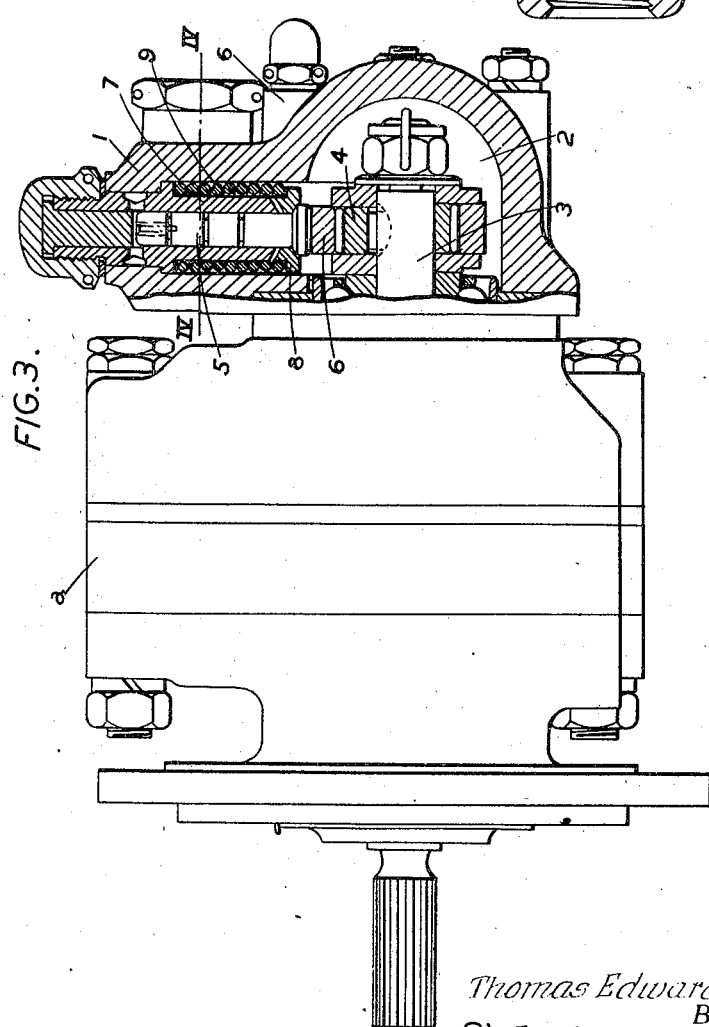
Inventor
Thomas Edward Beacham
By
Stone, Artman & Biagon
Attorneys

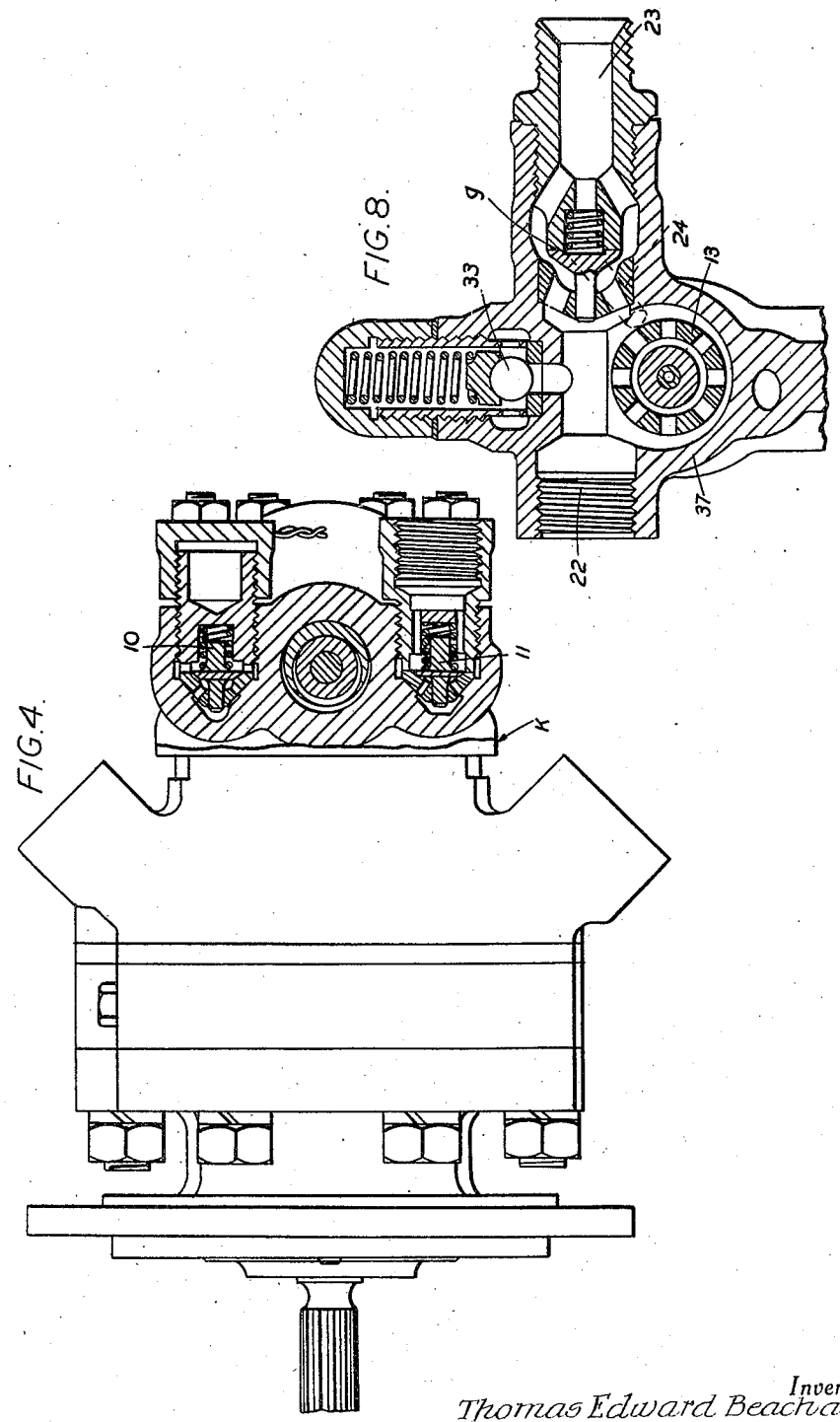

Feb. 24, 1948. T. E. BEACHAM 2,436,544
CONTROL GEAR FOR HYDRAULIC PUMPS
Filed Aug. 30, 1943 4 Sheets-Sheet 4
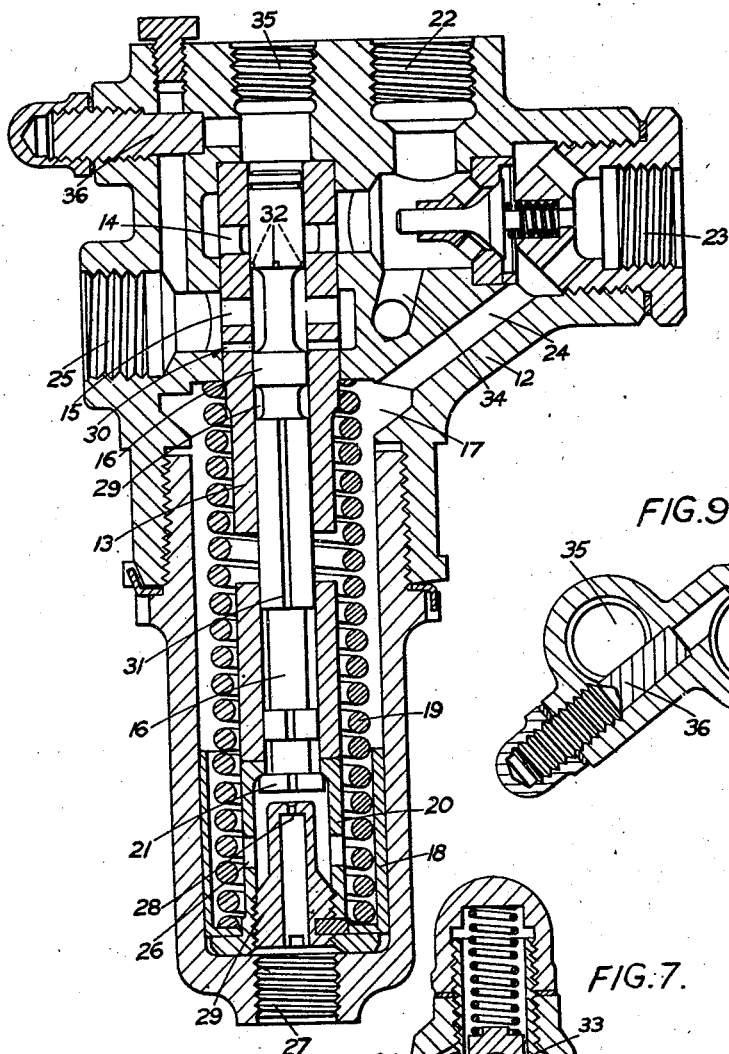
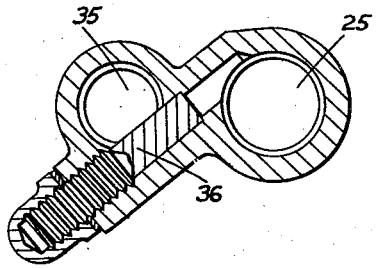
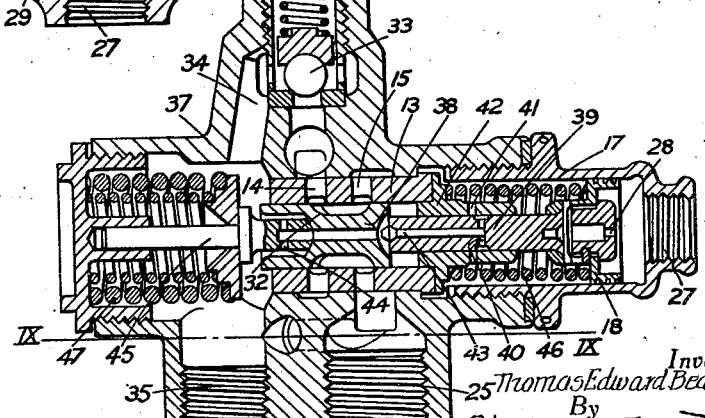
Inventor
Thomas Edward Beacham,
By
Stone, Artman + Bisson
Attorneys.

Patented Feb. 24, 1948

2,436,544

UNITED STATES PATENT OFFICE 2,436,544

CONTROL GEAR FOR HYDRAULIC PUMPS

Thomas Edward Beacham, London, England

Application August 30, 1943, Serial No. 500,549
In Great Britain August 20, 1942

Section 1, Public Law 690, August 8, 1946
Patent expires August 20, 1962

12 Claims. (Cl. 103—41)

This invention relates to hydraulic pressure supply systems, and refers more particularly to control gear therefor.

One object of the invention is to provide an improved control for use with fixed capacity hydraulic pumps such as are employed for delivering hydraulic pressure to a pipe line whence it passes to operate some hydraulic apparatus such, for example, as that used on aircraft for actuating and controlling the undercarriage.

Control gears for this purpose are, of course, quite common, but as at present constructed and operating they suffer from the disadvantage that a wide range of pressure is required for their operation, or, in other words, the pressure at which the pump cuts out is much higher than that at which it cuts in. Such known control gears also suffer from the disadvantage that when there is a demand for the hydraulic fluid pressure which is less than the pump delivery the control gear cuts the pump in and out at a very rapid rate unless an accumulator is used.

A further object of this invention is to provide a hydraulic pressure supply system which does not suffer from these and other disadvantages of existing systems.

A further object of the invention is to provide an hydraulic pressure supply system in which both a main and an auxiliary pump are employed and the arrangement is such that if the demand for pressure fluid is less than the full output of the main pump the by-pass valve is operated to direct a suitable part of the delivery of the pump back to the storage tank instead of into the pressure main, whilst at zero or very small demands the by-pass valve is operated to direct the whole delivery of the main pump back to the tank, leaving the auxiliary pump to supply any slight demands and maintain the required pressure in the pipe line. Provision may also be made, under these conditions, for by-passing the delivery of the auxiliary pump, also, back to the tank, when the pressure on the main pipe line rises to a predetermined limit.

In order that the invention may be clearly understood and readily carried into practice, reference will now be had to the accompanying drawings, illustrating the invention, and apparatus constructed in accordance therewith. In the drawings:

Figure 1 is a diagram illustrating a control system according to the invention, as operative with a reduced demand for pressure fluid.

Figure 2 is a diagram illustrating the action of the by-pass valve at zero demand, or very small demands.

Figure 3 is an elevation of one construction of the main and auxiliary pumps of the system, with the auxiliary pump shown in vertical section.

Figure 4 is a corresponding plan view, with the auxiliary pump in section on the line IV—IV of Figure 3.

Figure 5 is a longitudinal section of one construction of by-pass valve for use in carrying the invention into practice according to one method.

Figure 6 is a part sectional view on line VI—VI of Figure 5.

Figure 7 is a longitudinal section of another construction of by-pass valve for use in carrying the invention into practice according to a modified method.

Figure 8 is a sectional view on line VIII—VIII of Figure 7, and

Figure 9 is a sectional view on line IX—IX of Figure 7.

Referring to Figures 1 and 2, which illustrate diagrammatically a control system according to the present invention, the main pump is indicated at $a$ and the auxiliary pump, driven from the main pump shaft, at $b$. The suction side of the pump $a$ draws its oil or other working fluid from the storage tank $c$ by pipe line $d$ and delivers to pressure pipe line $e$ through delivery pipe $f$ and non-return valve $g$. The return flow or low pressure pipe line $h$ is connected to the tank $c$ by pipe $i$.

The auxiliary pump $b$ is connected to pressure pipe line $e$ by pipe $j$ at a point beyond the non-return valve $g$. Between pipes $j$ and $i$ is connected a safety valve $l$, through which the pressure in the pipe $j$ connected to pressure line $e$ is relieved to tank $c$, when the pressure exceeds a predetermined value as a result of zero or very low demand on the pressure pipe line $e$.

The above equipment operates in conjunction with the by-pass valve $m$ which consists of a grooved piston moving in a cylinder having a pair of ports connected by pipes $n$ and $o$ respectively to delivery pipe $f$ of main pump $a$ and low pressure return pipe $i$ leading to tank $c$. The by-pass valve $m$ thus provides a shunt path which can short circuit the delivery of main pump $a$ to the tank $c$, instead of to the pressure pipe line $e$, when the by-pass valve piston is set with its groove bridging the ports connected to pipes $n$ and $o$, as shown in Figure 2.

The piston of the by-pass valve $m$ is operated against a spring by the fluid pressure of pipe $j$, either acting directly against the end thereof as in Figure 3, or acting indirectly, as indicated diagrammatically in Figures 1 and 2, through the intermediary of a piston or plunger $p$ moving in a cylinder connected by pipe $q$ to pipe $j$. If the pressure in pressure pipe line $e$ rises, due to a reduced demand for pressure fluid by the various hydraulically operated devices connected thereto, the rise in pressure will be transmitted back to pipe $j$ and will cause an increase of pressure on piston $p$, as a result of which the piston of by-pass valve $m$ will be pressed upwardly. As long as the demand is not reduced below a certain level the piston of by-pass valve $m$ will not completely uncover the ports of pipes $n$ and $o$, but will allow a certain leakage of the main pump delivery back to tank $c$ instead of into pressure pipe line $e$ through non-return valve $g$, as shown in Figure 1. The by-pass valve $m$ will thus act as a safety valve limiting the pressure in the main pump delivery pipe $f$ to a predetermined value.

If, however, the demand on pressure pipe line $e$ is zero or very small, the pressure on pipe $e$ will rise until the piston $p$ reaches its highest position, in which the by-pass valve is raised so as completely to uncover the ports of pipes $n$ and $o$ and provide free flow of fluid from main pump delivery pipe $f$ to pipe $i$ leading back to tank $c$ as shown in Figure 2. Thus the main pump $a$ ceases to deliver fluid to pressure pipe line $e$ through non-return valve $g$, and will operate practically under no-load conditions. On the other hand the auxiliary pump $b$ will continue to deliver to the main pipe line $e$ beyond the non-return valve $g$ and will serve to maintain the pressure therein necessary to meet the small demand. Should, however, the demand be zero or so small that the pressure in pipe $j$ rises above a given value, then the excess pressure is relieved back to tank $c$ via pipe $i$ through safety valve $l$, as shown in Figure 2.

It will be understood that the suction side of auxiliary pump $b$ will be connected to the delivery chamber of the main pump $a$, or if desired to a point between the stages in the case of a multi-stage pump.

Figures 3 and 4 illustrate a practical construction for the combined main and auxiliary pumps $a$ and $b$ respectively. The auxiliary pump $b$ is contained in a casing 1 bolted on the end of the main pump $a$, said casing 1 having a cavity 2 into which the shaft 3 of the main pump extends. The projecting end of shaft 3 carries an eccentric 4 which is encircled by a driving ring 6, with intermediate needle rollers, and the driving ring 6 operates on the end of a plunger or piston 5 sliding in a cylinder or bush 7 in casing 1. Behind the head of piston 5 is fitted a pad or collar 8 and between said pad and a flange on bush 7 is disposed a spring 9. As the eccentric 4 rotates it raises the piston 5, which is then returned by spring 9.

The interior of cylinder or bush 7 in which piston 5 reciprocates is connected through suction valve 10 and a passage in casing of main pump $a$ with the delivery chamber of the main pump, or, if preferred, with a passage between the stages in the case of a multi-stage pump, and said cylinder 7 is also connected to the auxiliary pump pipe line $j$ through a delivery valve 11. The reciprocation of piston 5 maintains the fluid pressure in pipe line $j$ with a succession of pumping impulses.

Figures 5 and 6 illustrate one constructional form of by-pass control valve $m$ according to the invention. The casing 12 contains a bush 13, having rings of upper ports 14 and lower ports 15, in which slides the annularly grooved by-pass piston valve 16. This valve 16 has a stem which extends into the cylindrical chamber 17 which contains a hollow damping piston 18, pressed downwardly by a control spring 19 against a flange on a thimble 20 engaged behind the enlarged head 21 at lower end of valve stem 16. The upper end of spring 19 bears against the interior of casing 12.

The casing 12 also contains the non-return valve $g$ and is provided with connections 22 and 23 respectively for the pipe $f$ leading to the main pump $a$ and for the pressure pipe line $e$. The connection 23 communicates with chamber 17 through a passage 24 which corresponds to the pipe $j$ of Figs. 1 and 2, and the fluid passes from chamber 17 into the thimble 20 through the ports 26, so that the pressure in pipe line $i$ is applied dirrectly to the end of the stem of piston valve 16. The chamber in casing 12 with which connection 22 communicates surrounds the upper ports 14 of bush 13, whilst the lower ports 15 are surrounded by a chamber communicating with a connection 25 adapted for connection to the end of the pipe $i$ leading to tank $c$.

The delivery pipe from the auxiliary pump is connected to chamber 17 at 27 and the orifice 28 in hollow plug 29, within thimble 20 allows restricted passage of the fluid from one side to the other of piston 18 as it oscillates. This serves to damp oscillation of the piston valve 18 and prevent any tendency thereof to vibrate. As the pressure in chamber 17 rises due to reduction of demand on pipe line $e$ and to the delivery of the auxiliary pump $b$ into the chamber 17 through orifice 28, the piston valve 16 will rise until its upper groove bridges ports 14 and 15 in bush 13, thereby by-passing the main pump delivery from 22 to the connection 25 leading back to tank $c$, instead of delivery taking place through valve $g$ to outlet connection 23 connected to pressure pipe line $e$. At first this by-passing action will only be partial, but ultimately it will become complete. When the pressure in chamber 17 reaches a predetermined limit the piston valve reaches a position in which a second groove 29 therein comes into communication with small ports 30 in bush 13 below its lower main ports 15, said ports 20 communicating with low pressure outlet connection 25. Along the stem of piston valve 16 runs a groove 31 which provides communication between the interior of thimble 20 and piston valve groove 29. Thus when piston valve 16 is raised into a position bringing its groove 29 into communication with ports 30 the rising pressure in chamber 17 due to action of the auxiliary pump $b$ is relieved back to tank $c$ through low pressure pipe $i$.

Small grooves 32 are provided in piston valve 16 intersecting the upper edge of the upper piston valve groove, so that the full opening of the valve is preceded by a gradual partial opening which increases in proportion to the movement of the valve. By this means the elimination of piston valve vibration is assisted. While the grooves 28 and 31 and ports 30 relieve gradual rise of pressure in chamber 17, it may happen that a sudden rise of pressure in the pipe line $e$ may take place at a rate quicker than the response of the piston valve 16, which will be delayed by the damping piston 18, so that a surge of pressure results. To safeguard against damage resulting from such a surge of pressure the control device incorporates a safety valve 33 (Figure 6). This safety valve is located in a chamber connected by passage 34 with the main pump delivery connection 22, on the pump side of the non-return valve g, and it releases the pressure into the connection 25 leading to the tank c.

In the control device, as shown, an additional outlet 35 is provided to enable the device to serve both a high and low pressure hydraulic system. As shown there is a passage leading from connection 25 to connection 35, which in the case of a high pressure system only, provides free communication between the outlet 25 and the space at the end of piston valve 16, which space is closed by a plug 36 inserted into connection 35. Thus the piston valve will be free to move as hereinbefore described. In the drawings, however, the passage between 25 and 35 is obstructed by a removable plug 36, and in this event the outlet 35 is connected direct to the oil tank c, whilst the outlet 25 is connected indirectly to the tank c through a low pressure supply pipe line. This arrangement prevents the pressure existing in outlet 25 from affecting the pressure at which the oil from the auxiliary pump is released through ports 30. It will be appreciated that if it is only desired to control a high pressure system the plug 36 is replaced by a shorter plug which does not obstruct passage between 25 and 35, and the outlet 35 is plugged off.

Figures 7, 8 and 9 illustrate a modified construction of by-pass control valve, in which the pressure in the main pressure pipe line e does not act directly on the end of the by-pass valve piston, as in Figures 5 and 6, but acts on a separate operating piston, as shown in the diagrams of Figures 1 and 2.

In this modified construction the valve comprises a casing 37, containing a bush 13 with two rings of ports 14 and 15 as in Figures 5 and 6, said rings of ports being surrounded by annular chambers communicating respectively with the main pump delivery pipe f through inlet connection 22 and with the tank c through pipe i, and outlet connection 25.

As before, the inlet chamber communicates with the pressure pipe line e through a non-return valve g, and outlet connection 23, and communicating with said chamber is the safety valve 33 which relieves the pressure through passage 34 to the space at the end of valve 38, which communicates with auxiliary outlet 35, which can be plugged off if desired and is then placed in communication with outlet 25, which is connected direct to the storage tank c, through pipe i, or can itself be connected direct to the tank c through low pressure pipe i, in which case a plug 36 is inserted to block connection between 25 and 35, so that connection 25 can be connected to tank c through a low pressure supply main, as described with reference to Figures 5 and 6.

The inlet connection 27 of casing 37 communicates with the demand side of the non-return valve g, as in Figs. 5 and 6, the connection being via the orifice 28, chamber 17 and passage 24 (see Figure 8).

The operating piston 39 for the by-pass piston valve 38, is of less diameter than the piston valve, and it has a flat end, an arcuate depression in the end of the valve 38 being arranged to place the end of the by-pass piston in hydraulic communication with the passage 43. The head of piston 39 engages a damping piston 18 which slides in the chamber 17 against the pressure of spring 45, and oil can pass from one side to the other of the piston through orifice 28. When the piston 39 has travelled to the maximum desired extent holes 40 therein register with passages 41 in the piston guide bush 42, so that oil from chamber 17 can pass along the operating piston through bore 43, through a bore in piston valve 38 and thence through holes 44 in piston extension rod 45 to the space at the end of the piston valve communicating with the tank c through outlet 35 or outlet 25.

Another modification in this construction is the sub-division of the spring pressure acting on the piston valve 38, into a spring 46 acting on damping piston 18, and a compound spring 47 acting on an abutment collar carried by rod 45 which is engaged in a cup depression in the end of the piston valve 38 and constitutes an extension of the piston.

It is to be understood that the invention is not limited to the details of construction hereinbefore described. The main and auxiliary pumps may be of any desired type, and are not necessarily of the types illustrated in Figs. 3 and 4. Further the auxiliary pump casing may be integral with that of the main pump, or the auxiliary pump casing may be quite independent of that of the main pump, although the pumps are drivingly coupled together.

What I claim is:

1. A hydraulic pressure supply system comprising a main pump, an auxiliary pump, a common supply line, a main delivery line from the main pump to the common supply line, an auxiliary delivery line from the auxiliary pump to the common supply line, a control valve responsive to pressure existing in the common supply line and positioned in the main and auxiliary delivery lines for withdrawing fluid therefrom, and means in said control valve for withdrawing fluid in quantities proportional to the rise in pressure in the supply line, whereby the fluid pressure in the supply line operates to vary the delivery to the supply line from a maximum downwards in infinite decrements until the delivery falls below the output capacity of the auxiliary pump.

2. A hydraulic pressure supply system comprising a main pump delivering to a supply line leading to the mechanism to be actuated, a non-return valve located in the supply line between the pump and the mechanism to be actuated, an auxiliary pump of smaller capacity than the main pump and delivering to the supply line at a point between the mechanism to be actuated and the non-return valve, a by-pass control valve subject to actuation by pressure in the supply line and operating to control a passage between the delivery side of the main pump and the suction side of the main pump, whereby when flow in the supply line decelerates the by-pass control valve operates to establish free connection from the delivery side of the main pump to the suction side thereof.

3. A hydraulic pressure supply system comprising a main pump and an auxiliary pump coupled thereto, in association with a by-pass valve which controls the delivery of the main pump and whose operation is subject to the pressure in the common supply line, in such manner that at full demands on the common supply line, the full delivery of the main and auxiliary pumps passes to said pipe line, at predetermined reduced demand part of the main pump delivery is by-passed back to the fluid storage tank, at another predetermined reduced demand the whole of the main pump delivery is so by-passed and the demand met wholly by the auxiliary pump, whilst at zero demand any rise of pressure in the common supply pipe line above a predetermined value, due to the action of the auxiliary pump, is relieved back to the storage tank.

4. A hydraulic pressure supply system comprising a continuously operating main pump, a continuously operating auxiliary pump, a common supply line receiving the output of both pumps, means inversely responsive to back pressures in the supply line first, for by-passing fluid delivered by the main pump, and then after all fluid delivered by the main pump has been withdrawn for by-passing fluid delivered by the auxiliary pump, whereby the pressure in the supply line may be maintained without causing labor on the pumps, said last named means comprising a check-valve in the outlet of the main pump, a by-pass valve positioned between the main pump and said check-valve, and means responsive to rising pressures in the supply line for opening said by-pass valve.

5. A hydraulic pressure supply system comprising a main pump, an auxiliary pump, a common supply line receiving the output of both pumps, a check valve in said common supply line, an automatic by-pass valve positioned between the delivery outlet of the main pump and said check valve, and means responsive inversely to pressures in the common supply line for opening and closing said by-pass valve, said means comprising a piston reciprocable in a cylinder, duct means for communicating the fluid in the common supply line to the work face of said piston, and means connecting the piston to said valve for opening the same when the piston is moved in response to an increase of pressure in the supply line.

6. A hydraulic pressure supply system comprising a main pump, an auxiliary pump, a common supply line, a check valve in said common supply line, a main delivery line connecting the main pump to said check valve, an auxiliary delivery line connecting the auxiliary pump to the common supply line, a cylinder constituting a portion of the main delivery line, a piston in said cylinder, a relief passageway in said cylinder axially spaced from the main delivery line, a groove in said piston of a longitudinal extent capable of connecting the delivery line to the relief passageway, means responsive to rising pressures in the common supply line for moving said piston so that the groove will connect said main delivery line and relief passageway, said groove being shaped so as to withdraw fluid from the main delivery line in gradually increasing quantities.

7. A hydraulic pressure supply system comprising a main pump, an auxiliary pump, a common supply line, a check valve in said common supply line, a main delivery line connecting the main pump to said check valve, an auxiliary delivery line connecting the auxiliary pump to the common supply line, a cylinder constituting a portion of the main delivery line, a piston in said cylinder, a relief passageway in said cylinder axially spaced from the main delivery line, a groove in said piston of a longitudinal extent capable of connecting the delivery line to the relief passageway, means responsive to rising pressures in the common supply line for moving said piston so that the groove will connect said main delivery line and relief passageway, said groove in the piston having small auxiliary ports at the side of the groove which approaches said delivery line on rising pressure in the common supply line, whereby slight rises in pressure in the common supply line will be offset by small withdrawals of fluid from the main delivery line.

8. A hydraulic pressure supply system comprising a main pump, an auxiliary pump, a common supply line receiving fluid from the main pump by a main delivery line having a check valve therein and from the auxiliary pump by an auxiliary delivery line, a fluid actuated piston mounted in said auxiliary delivery line so that the piston's work face may be actuated by pressures in the auxiliary delivery line, a port in the wall of the piston chamber connected to the main delivery line, a by-pass port in the wall of the piston chamber between the delivery line port and the work end of the cylinder, means on the piston for connecting the delivery line port to the by-pass port gradually during the first portion of the stroke of the piston in response to rising pressures in the common supply line, and means for connecting the common supply line to said by-pass opening during the latter portion of the stroke of the piston.

9. A continuously operating main pump, a continuously operating auxiliary pump, a common supply line, a main delivery line connecting the main pump to the common supply line, an auxiliary delivery line connecting the output of the auxiliary pump to the common supply line, means for gradually withdrawing fluid first from the main pump delivery line and then from the auxiliary pump delivery line in response to rising back pressures in the common supply line, and a safety valve for withdrawing fluid from the common supply line in response to an abrupt rise in back pressure in the common supply line.

10. A hydraulic pressure supply system comprising a main pump, an auxiliary pump, a common supply line, a main delivery line connecting the output of the main pump to the common supply line, an auxiliary delivery line connecting the output of the auxiliary pump to the common supply line, a check valve in the main delivery line, by-pass valve means in the main delivery line between the main pump and the check valve and responsive inversely to pressure changes in the common supply line for withdrawing fluid from the main delivery line, a piston for functioning said valve means, said piston being responsive to pressure conditions in the auxiliary delivery line, and a reduced passageway in the auxiliary delivery line between the auxiliary pump and said piston whereby fluctuations in pressure in the common supply line will be damped so as to minimize vibration of the piston.

11. A pressure responsive by-pass valve comprising a cylinder, a piston reciprocable in said cylinder and a fluid opening in one end of said piston for reciprocating the same, a fluid passageway in the other end of said cylinder, a by-pass opening in said cylinder positioned between the through passageway and the pressure end of the cylinder, and means on the piston for connecting the through passageway to the by-pass passageway in response to movement of the piston due to increased pressure.

12. A pressure responsive by-pass valve comprising an L-shaped casting, a passageway lengthwise of one arm of said casting, a piston chamber lengthwise of the other arm of said casting and intercepting said passageway, a check-valve in the delivery side of said passageway, a piston in said cylinder, to the blocked face of the check-valve in the first mentioned passageway, a by-pass passageway from the said cylinder, and means on the piston for connecting the by-pass passageway to the through passageway in response to rising pressures on the blocked face of the check valve.

THOMAS EDWARD BEACHAM.

REFERENCES CITED

The following references are of record in the file of this patent:

UNITED STATES PATENTS

| Number | Name | Date |
|---|---|---|
| 1,110,567 | McAulay | Sept. 15, 1914 |
| 1,770,297 | Bussmann | July 8, 1930 |
| 1,889,517 | Roessler | Nov. 29, 1932 |
| 2,219,488 | Parker | Oct. 29, 1940 |
| 2,241,665 | Herman | May 13, 1941 |
| 2,256,743 | Kleckner | Sept. 23, 1941 |
| 2,271,826 | Mercier | Feb. 3, 1942 |
| 2,279,176 | Pardee | Apr. 7, 1942 |
| 2,310,078 | Herman | Feb. 2, 1943 |
| 2,316,445 | Marshall | Apr. 13, 1943 |